(12) United States Patent
Hoole

(10) Patent No.: US 6,785,300 B2
(45) Date of Patent: *Aug. 31, 2004

(54) DELAY COMPENSATION

(75) Inventor: Elliott Hoole, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,272

(22) Filed: Oct. 17, 2002

(65) Prior Publication Data

US 2003/0053488 A1 Mar. 20, 2003

Related U.S. Application Data

(63) Continuation of application No. 09/270,987, filed on Mar. 17, 1999, now Pat. No. 6,501,771, which is a continuation of application No. 08/797,198, filed on Feb. 11, 1997, now Pat. No. 5,907,577, which is a continuation of application No. 08/796,491, filed on Feb. 6, 1997, now Pat. No. 5,799,000.

(51) Int. Cl.[7] .............................. H04J 3/06; H04J 11/00
(52) U.S. Cl. ....................... 370/519; 370/206; 370/210; 370/319
(58) Field of Search ................................ 370/503, 506, 370/508, 516, 518, 519, 480, 481, 483, 484, 328, 334, 319, 339, 344, 206, 207, 210, 252, 320, 335, 342; 375/130, 261, 268, 269

(56) References Cited

U.S. PATENT DOCUMENTS 3,522,540 A   8/1970   Lee ............................ 455/207
3,633,107 A   1/1972   Brady ......................... 375/267
3,641,463 A   2/1972   Perks .......................... 332/124
3,745,464 A   7/1973   Lee ............................. 455/61

(List continued on next page.)

FOREIGN PATENT DOCUMENTS

CA   2278852       8/1998
EP   0 490 509 B1   6/1992

(List continued on next page.)

OTHER PUBLICATIONS

U.S. patent application Ser. No. 10/435,304, Alamouti et al, filed May 8, 2003.

Chan et al., "Efficient Frequency Assignments Scheme for Intermodulation Distortion Reduction in Fiber–Optic Microcellular Systems," Electronic Letters, Oct. 27, 1994, pp. 1831–1832, vol. 30, No. 22, IEEE, Stevenage, UK.

(List continued on next page.)

*Primary Examiner*—Brian Nguyen
(74) *Attorney, Agent, or Firm*—Perkins Coie LLP

(57) ABSTRACT

In a discrete tone system, a base station receives a transmission burst from a remote unit being installed that includes delay compensation pilot tones that are uniformly spread throughout the transmission bandwidth. The arrival time transmission burst is not synchronized with the other remote units transmitting to the base station. The base station measures the phase delay of each tone and calculates the delay of the remote unit from the slope of the line of phase angle versus tone frequency. The base station transmits a signal to the remote unit that includes the magnitude and direction of the delay, which allows the remote unit to adapt the timing of its transmission to be synchronized with the other remote units.

14 Claims, 4 Drawing Sheets

U.S. PATENT DOCUMENTS

| | | | |
|---|---|---|---|
| 3,971,988 A | 7/1976 | Denenberg | 455/143 |
| 4,249,181 A | 2/1981 | Lee | 342/367 |
| 4,381,562 A | 4/1983 | Acampora | 370/323 |
| 4,383,332 A | 5/1983 | Glance et al. | 455/562.1 |
| 4,412,350 A | 10/1983 | Miedema | 455/306 |
| 4,488,445 A | 12/1984 | Aske | 73/514.33 |
| 4,495,648 A | 1/1985 | Giger | 455/73 |
| 4,510,595 A | 4/1985 | Glance et al. | 370/278 |
| 4,644,562 A | 2/1987 | Kavehrad | 375/232 |
| 4,723,321 A | 2/1988 | Saleh | 455/295 |
| 4,726,040 A | 2/1988 | Acampora | 375/316 |
| 4,789,983 A | 12/1988 | Acampora et al. | 370/349 |
| 4,807,253 A | 2/1989 | Hagenauer et al. | 375/248 |
| 4,827,499 A | 5/1989 | Warty et al. | 455/560 |
| 4,835,517 A | 5/1989 | van der Gracht et al. | 340/310.07 |
| 4,914,676 A | 4/1990 | Iwamatsu et al. | 375/349 |
| 5,029,185 A | 7/1991 | Wei | 375/245 |
| 5,048,057 A | 9/1991 | Saleh et al. | 375/267 |
| 5,054,035 A | 10/1991 | Tarallo et al. | 375/225 |
| 5,056,112 A | 11/1991 | Wei | 375/280 |
| 5,084,869 A | 1/1992 | Russell | 370/329 |
| 5,088,113 A | 2/1992 | Wei | 375/280 |
| 5,136,612 A | 8/1992 | Bi | 370/342 |
| 5,177,765 A | 1/1993 | Holland et al. | 375/368 |
| 5,226,071 A | 7/1993 | Bolliger et al. | 455/435.3 |
| 5,260,967 A | 11/1993 | Schilling | 370/342 |
| 5,260,968 A | 11/1993 | Gardner et al. | 375/347 |
| 5,274,384 A | 12/1993 | Hussain et al. | 342/373 |
| 5,278,892 A | 1/1994 | Bolliger et al. | 455/442 |
| 5,289,464 A | 2/1994 | Wang | 370/336 |
| 5,291,475 A | 3/1994 | Bruckert | 370/336 |
| 5,295,138 A | 3/1994 | Greenberg et al. | 370/344 |
| 5,295,152 A | 3/1994 | Gudmundson et al. | 370/342 |
| 5,302,914 A | 4/1994 | Arntz et al. | 330/129 |
| 5,305,308 A | 4/1994 | English et al. | 370/335 |
| 5,305,353 A | 4/1994 | Weerackody | 375/347 |
| 5,319,634 A | 6/1994 | Bartholomew et al. | 370/441 |
| 5,361,397 A | 11/1994 | Wright | 340/7.36 |
| 5,363,375 A | 11/1994 | Chuang et al. | 370/332 |
| 5,367,539 A | 11/1994 | Copley | 375/347 |
| 5,394,435 A | 2/1995 | Weerackody | 375/144 |
| 5,400,322 A | 3/1995 | Hunt et al. | 370/468 |
| 5,410,538 A | 4/1995 | Roche et al. | 370/479 |
| 5,410,740 A | 4/1995 | Hagstrom | 455/67.11 |
| 5,414,699 A | 5/1995 | Lee | 370/342 |
| 5,438,329 A | 8/1995 | Gastouniotis et al. | 340/870.02 |
| 5,463,656 A | 10/1995 | Polivka et al. | 375/130 |
| 5,481,570 A | 1/1996 | Winters | 375/347 |
| 5,490,174 A | 2/1996 | Shin et al. | 375/316 |
| 5,504,775 A | 4/1996 | Chouly et al. | 370/216 |
| 5,509,015 A | 4/1996 | Tiedemann, Jr. et al. | 370/311 |
| 5,515,378 A | 5/1996 | Roy, III et al. | 370/334 |
| 5,541,954 A | 7/1996 | Emi | 375/133 |
| 5,570,349 A | 10/1996 | Bustamante et al. | 370/335 |
| 5,598,428 A | 1/1997 | Sato | 375/148 |
| 5,613,211 A | 3/1997 | Matsuno | 455/502 |
| 5,613,219 A * | 3/1997 | Vogel et al. | 455/78 |
| 5,654,955 A | 8/1997 | Natali | 370/320 |
| 5,657,313 A | 8/1997 | Takahashi et al. | 370/491 |
| 5,657,355 A | 8/1997 | Reusens | 375/340 |
| 5,661,780 A | 8/1997 | Yamamoto et al. | 455/573 |
| 5,689,502 A | 11/1997 | Scott | 370/281 |
| 5,694,388 A | 12/1997 | Sawahashi et al. | 370/206 |
| 5,732,068 A | 3/1998 | Takahashi et al. | 370/206 |
| 5,732,113 A | 3/1998 | Schmidl et al. | 375/355 |
| 5,734,647 A | 3/1998 | Yoshida et al. | 370/335 |
| 5,745,860 A | 4/1998 | Kallin | 455/574 |
| 5,752,168 A | 5/1998 | Monot et al. | 455/67.13 |
| 5,752,202 A | 5/1998 | Obright | 455/574 |
| 5,799,000 A | 8/1998 | Hoole | 370/210 |
| 5,802,044 A | 9/1998 | Baum et al. | 370/330 |
| 5,864,543 A | 1/1999 | Hoole | 370/280 |
| 5,875,208 A | 2/1999 | Hoole | 375/130 |
| 5,896,425 A | 4/1999 | Hirano et al. | 375/354 |
| 5,907,577 A | 5/1999 | Hoole | 375/130 |
| 5,914,981 A | 6/1999 | Veintimilla | 375/145 |
| 5,923,700 A | 7/1999 | Zhang | 375/141 |
| 5,924,034 A * | 7/1999 | Dupuy | 455/440 |
| 5,933,421 A | 8/1999 | Alamouti et al. | 370/330 |
| 5,933,478 A | 8/1999 | Ozaki et al. | 379/93.24 |
| 5,943,375 A * | 8/1999 | Veintimilla | 375/355 |
| 5,987,338 A | 11/1999 | Gibbons et al. | 455/574 |
| 5,999,569 A | 12/1999 | Oshima | 375/265 |
| 6,047,200 A | 4/2000 | Gibbons et al. | 455/574 |
| 6,064,338 A | 5/2000 | Kobayakawa et al. | 342/378 |
| 6,073,032 A | 6/2000 | Keskitalo et al. | 455/561 |
| 6,081,566 A | 6/2000 | Molnar et al. | 375/347 |
| 6,084,932 A | 7/2000 | Veintimilla | 375/355 |
| 6,085,114 A | 7/2000 | Gibbons et al. | 455/574 |
| 6,128,276 A | 10/2000 | Agee | 370/208 |
| 6,131,016 A | 10/2000 | Greenstein et al. | 455/69 |
| 6,160,839 A | 12/2000 | Zhang | 375/130 |
| 6,175,555 B1 | 1/2001 | Hoole | 370/280 |
| 6,198,719 B1 | 3/2001 | Faruque et al. | 370/209 |
| 6,215,777 B1 | 4/2001 | Chen et al. | 370/335 |
| 6,216,019 B1 | 4/2001 | Gibbons et al. | 455/574 |
| 6,347,236 B1 | 2/2002 | Gibbons et al. | 455/574 |
| 6,359,923 B1 | 3/2002 | Agee et al. | 375/130 |
| 6,408,016 B1 | 6/2002 | Zhang | 375/130 |
| 6,442,222 B1 | 8/2002 | Ghazi-Moghadam et al. | 375/347 |
| 6,480,522 B1 | 11/2002 | Hoole et al. | 375/130 |
| 6,487,235 B2 | 11/2002 | Hoole | 375/130 |
| 6,501,771 B2 * | 12/2002 | Hoole | 370/479 |
| 6,510,182 B1 | 1/2003 | Lee et al. | 375/259 |
| 6,519,278 B1 | 2/2003 | Hiramatsu | 375/140 |
| 6,560,209 B1 | 5/2003 | Alamouti et al. | 376/330 |
| 6,584,144 B2 | 6/2003 | Alamouti et al. | 375/147 |
| 6,600,776 B1 | 7/2003 | Alamouti et al. | 375/147 |
| 2002/0034217 A1 | 3/2002 | Zhang | 375/141 |
| 2002/0122465 A1 | 9/2002 | Agee et al. | 375/141 |
| 2003/0156570 A1 | 8/2003 | Alamouti et al. | 370/347 |

FOREIGN PATENT DOCUMENTS

| | | |
|---|---|---|
| EP | 0 582 537 A3 | 2/1994 |
| EP | 0 637 181 B1 | 2/1995 |
| EP | 0 639 035 A1 | 2/1995 |
| EP | 0 641 096 A1 | 3/1995 |
| EP | 0 653 859 A1 | 5/1995 |
| EP | 0 653 973 B1 | 5/1995 |
| EP | 0 668 664 A1 | 8/1995 |
| EP | 0 685 973 A2 | 12/1995 |
| EP | 0 690 593 A2 | 1/1996 |
| EP | 0 696 856 A2 | 2/1996 |
| WO | WO 94/05094 A1 | 3/1994 |
| WO | WO 94/13077 A1 | 6/1994 |
| WO | WO 94/19877 A1 | 9/1994 |
| WO | WO 95/09512 A1 | 4/1995 |
| WO | WO 95/10144 A1 | 4/1995 |
| WO | WO 95/32595 A1 | 11/1995 |
| WO | WO 96/09731 A1 | 3/1996 |
| WO | WO 96/22662 A1 | 7/1996 |
| WO | WO 96/31009 A1 | 10/1996 |
| WO | WO 96/36136 A1 | 11/1996 |
| WO | WO 96/39001 A1 | 12/1996 |
| WO | WO 97/01256 A1 | 1/1997 |
| WO | WO 97/02665 A | 1/1997 |
| WO | WO 97/05709 A1 | 2/1997 |
| WO | WO 98/35463 A2 | 8/1998 |
| WO | WO 98/37638 A3 | 8/1998 |

OTHER PUBLICATIONS

Chang, "Synthesis of Band Limited Orthogonal Signals for Multichannel Data Transmission," Bell System Technical Journal, Dec. 1996, pp. 1775–1796, American Telephone and Telegraph Co., New York.

Cimini, Leonard J., Jr., "Analysis and Simulation of a Digital Mobile Channel Using Orthogonal Frequency Division Multiplexing" IEEE Transactions on Communications, Jul. 1985, pp. 665–675, vol. Comm. 33, No. 7, IEEE, New York.

Davies et al., Telecom Australia, Rev. Activities, 1985/1986, pp. 41–43.

Davies et al., "Proposed Advanced Base Station Antennas for Future Cellular Mobile Radio Systems," A.T.R., 1998, pp. 53–60, vol. 22, No. 1, Telecom Research Australia Lab, Australia.

Fazel, "Narrow–Band Interface Rejection in Orthogonal Multi–Carrier Spread Spectrum Communications," Record, 1994, Third Annual International Conference on Universal Personal Communications, IEEE, 1994, pp. 46–50.

Fazel, K., "Performance of CDMA/OFDM for Mobile Communication System," Second IEEE International Conference on Universal Personal Communications, Ottawa, Ontario, Oct. 12–15, 1993, pp. 975–979.

Ghazi–Moghadam, V. et al, "Interference Cancellation Using Adaptive Antennas," Sixth IEEE International Symposium on Personal, Indoor and Mobile Radio Communications, Sep. 1995, pp. 936–939.

Giner, V.C., "An Approximate Analysis of TDMA Out–of–Slot Random Access Protocols for Microcellular Mobile Communications," Int'l Journal of Wireless Information Networks, Jan. 1996, pp. 41–53, vol. 3 No. 1, XP002077581.

Iwai, H. et al., "An Investigation of Space–Path Hybrid Diversity Scheme for Base Station Reception in CDMA Mobile Radio," IEEE J.Sel.Areas, Comm., Jun. 1994, pp. 962–969, vol. SAC–12.

Jung, P. et al., "On Multicarrier CDMA Radio Systems With Joint Detection and Coherent Receiver Antenna Diversity," 1996 $5^{th}$ IEEE International Conference on Universal Personal Communication, Sep. 1996, pp. 61–65, vol. 1, IEEE, New York, XP00203391.

Kohno, R. et al., "A Spatially and Temporally Optimal Multi–User Receiver Using an Array Antenna for DS/CDMA," Sixth IEEE International Symposium on Personal, Indoor and Mobile Radio Communications, Sep. 1995, pp. 950–954, Toronto.

Litva, et al., "Fundamentals of Digital Beamforming," Digital Beamforming in Wireless Communications, 1996 Artech House, Inc., Chapter 2, pp. 13–57.

Naguib, A.F. et al., "Performance of CDMA Cellular Networks with Base–Station Antenna Arrays," in C.G. Gunther, ed. "Mobile Communications –Advanced Systems and Components," Springer–Verlag, Mar. 1994, pp. 87–100.

Ojanpera et al., "Frames–Hybrid Multiple Access Technology," 1996 IEEE $4^{th}$ Int'l Symposium on Spread Spectrum Techniques, Sep. 22–25, 1996, vol. 1, pp. 320–324.

Prasad, Ramjee, "CDMA System Concepts," CDMA For Wireless Personal Communications, 1196 Artech House, Inc. Chapter 3, pp. 39–61.

Proc. Virginia Tech Third Symposium on Wireless Personal Communications, Jun. 1993, pp. 15–1 to 15–12.

Quach, B. et al., "Hopfield Network Approach to Beamforming in Spread Spectrum Communications," IEEE Proc. Seventh SP Workshop on Statistical Signal and Array Processing, Jun. 1994, pp. 409–412.

Rappaport, Theodore S., "Mulitple Access Techniques for Wireless Communications," Wireless Communications: Principles and Practice, 1996 Prentice Hall, Chapter 8, pp. 395–410.

Rappaport et al., editors. "Wireless Personal Communications: Trends and Challenges," Kluwer Academic Publishers, 1994, Ch. 7, pp. 60–80.

Rohling H. et al., "Performance of an OFDM–TDMA Mobile Communication System," 1996 IEEE $46^{th}$ Vehicular Technology Conference 46, Apr. 28–May 1, 1996, vol. 3 No. 46, pp. 1589–1593, Atlanta XP000595799.

Sandhu, A. et al. "A Hopfield Neurobeamerformer for Spread Spectrum Communications," Sixth IEEE International Symposium on Personal, Indoor and Mobile Radio Communications, Sep. 1995.

Swales et al., "The Performance Enhancement of Multibeam Adaptive Base–Station Antennas for Cellular Land Mobile Radio Systems," IEEE Transactions on Vehicular Technology, Feb. 1990, pp. 56–67, vol. 39, No. 1, IEEE, New York.

Tsoulos, G. et al., "Adaptive Antennas for Third Generation DS–CDMA Cellular Systems," Proc. IEEE VTC'95, Aug. 1995, pp. 45–49.

Vandendorpe, L., "Multitone Direct Sequence CDMA System in an Indoor Wireless Environment," IEEE First Symposium on Communications and Vehicular Technology, Benelux Delft Netherlands, Oct. 27–28, 1993, pp. 4. 1–1 to 4. 1–8.

Vandendorpe, L., "Multitone Spread Spectrum Multiple Access Communications System in a Multipath Rician Fading Channel," IEEE Transactions on Vehicular Technology, vol. 44 No. 2, May 1995, pp. 327–337.

Vandendorpe, L. et al., "Analysis of Residual Interference After MSE Linear Equalization of Multitone Spread Spectrum Signals," Communications–Gateway to Gobalization, Proceedings of the Conference on Communications, Seattle, Jun. 18–22, 1995, vol. 3, pp. 1673–1677, XP000535041.

Vandendorpe, L. et al., "Performance Analysis of Linear Joint Multiple Access Interference Cancellation–Equalization for Asynchronous Multitone CDMA," IEEE, Sep. 25, 1995, pp. 537–541, XP000610292.

Wang, Y. et al., "Adaptive Antenna Arrays for Cellular CDMA Communication Systems," Proc. IEEE International Conference Acoustics, Speech and Signal Processing, Detroit, 1995, pp. 1725–1728.

Weinstein and Ebert, IEEE Trans. on Comm, Tech., vol. com–19, No. 5, Oct. 1971, p. 628.

Yee et al. "Multicarrier CDMA in Indoor Wireless Radio Networks," Proc. PIMRC '93, Sep. 1993, pp. 109–113, Yokohama, Japan.

Yee et al., "Multi–Carrier CDMA in Indoor Wireless Radio Networks," IEICE Transactions on Communications, Jul. 1994, pp. 900–904, vol. E77–B No. 7.

* cited by examiner

FIG. 8

|  | TONES FROM LOWER SUB-BAND | | | TONES FROM UPPER SUB-BAND | | | |
|---|---|---|---|---|---|---|---|
|  | $S_0$ | $S_1$ | ... | $S_{15}$ | $S_{16}$ | $S_{17}$ | ... | $S_{31}$ |
| BURST 0 | [DCP0] | [DCP1] | ... | [DCP15] | [DCP0] | [DCP1] | ... | [DCP15] |
| BURST 1 | [DCP0] | [DCP1] | ... | [DCP15] | [DCP0] | [DCP1] | ... | [DCP15] |
| BURST 2 | [DCP0] | [DCP1] | ... | [DCP15] | [DCP0] | [DCP1] | ... | [DCP15] |
| ⋮ | ⋮ | ⋮ | | ⋮ | ⋮ | ⋮ | | ⋮ |
| BURST 7 | [DCP0] | [DCP1] | ... | [DCP15] | [DCP0] | [DCP1] | ... | [DCP15] |

DCPs FROM ANTENNA ELEMENT 0

|  | $S_{32}$ | $S_{33}$ | ... | $S_{47}$ | $S_{48}$ | $S_{49}$ | ... | $S_{63}$ |
|---|---|---|---|---|---|---|---|---|
| BURST 0 | [DCP0] | [DCP1] | ... | [DCP15] | [DCP0] | [DCP1] | ... | [DCP15] |
| BURST 1 | [DCP0] | [DCP1] | ... | [DCP15] | [DCP0] | [DCP1] | ... | [DCP15] |
| BURST 2 | [DCP0] | [DCP1] | ... | [DCP15] | [DCP0] | [DCP1] | ... | [DCP15] |
| ⋮ | ⋮ | ⋮ | | ⋮ | ⋮ | ⋮ | | ⋮ |
| BURST 7 | [DCP0] | [DCP1] | ... | [DCP15] | [DCP0] | [DCP1] | ... | [DCP15] |

DCPs FROM ANTENNA ELEMENT 1

⋮

|  | $S_{224}$ | $S_{225}$ | ... | $S_{239}$ | $S_{240}$ | $S_{241}$ | ... | $S_{255}$ |
|---|---|---|---|---|---|---|---|---|
| BURST 0 | [DCP0] | [DCP1] | ... | [DCP15] | [DCP0] | [DCP1] | ... | [DCP15] |
| BURST 1 | [DCP0] | [DCP1] | ... | [DCP15] | [DCP0] | [DCP1] | ... | [DCP15] |
| BURST 2 | [DCP0] | [DCP1] | ... | [DCP15] | [DCP0] | [DCP1] | ... | [DCP15] |
| ⋮ | ⋮ | ⋮ | | ⋮ | ⋮ | ⋮ | | ⋮ |
| BURST 7 | [DCP0] | [DCP1] | ... | [DCP15] | [DCP0] | [DCP1] | ... | [DCP15] |

DCPs FROM ANTENNA ELEMENT 7

1) $S_0$ IS CORRELATED WITH $S_{16}$, $S_{32}$, $S_{48}$, ... $S_{240}$ AND $S_{16}$, $S_{32}$, ... $S_{240}$ ARE MULTIPLIED BY THE NORMALIZED CORRELATION COEFFICIENTS
2) $S_0$ IS ADDED TO THE NEW $S_{16}$, $S_{32}$, ... $S_{240}$
3) THE RESULTING SEQUENCE IS CORRELATED WITH S TO GIVE THE PHASE ANGLE
4) STEPS 1, 2 AND 3 ARE REPEATED FOR $S_1$, $S_{17}$, $S_{33}$, ... $S_{241}$, THEN FOR $S_2$, $S_{18}$, ... AND SO ON TO GET 16 PHASE ANGLES $$S = [1-i,\ -1+i,\ 1+i,\ -1+i,\ -1-i,\ -1+i,\ -1-i,\ 1-i]$$

DELAY COMPENSATION

The invention disclosed herein is related to the copending U.S. patent application by Alamouti, al., entitled "Method for Frequency Division Duplex Communications", Ser. No. 08/796,584, now U.S. Pat. No. 5,933,421, filed Feb. 6, 1997, assigned to AT&T, and incorporated herein by reference.

This application is a continuation of U.S. patent application Ser. No. 09/270,987, filed Mar. 17, 1999, now U.S. Pat. No. 6,501,771, which is a continuation of U.S. patent application Ser. No. 08/797,198, filed Feb. 11, 1997, now U.S. Pat. No. 5,907,577, which is a continuation of U.S. patent application Ser. No. 08/796,491, filed Feb. 6, 1997, now U.S. Pat. No. 5,799,000, to which priority is claimed.

FIELD OF THE INVENTION

This invention involves improvements to delay compensation systems and methods in a wireless discrete tone communications system.

BACKGROUND OF THE INVENTION

Wireless communications systems, such as cellular and personal communications systems, operate over limited spectral bandwidths and must make highly efficient use of the scarce bandwidth resource to provide good service to a large population of users. The Personal Wireless Access Network described in the Alamouti, et al. patent application cited above, is an example of a successful technology for wireless service.

The personal wireless access network (PWAN) system described in the referenced Alamouti et al. patent application, uses a form of protocol known as discrete tone to provide efficient communications between a base station and a plurality of remote units. In this protocol, the user's data signal is modulated by a set of weighted discrete frequencies or tones. The weights are spatial spreading codes that distribute the data signals over many discrete tones covering a broad range of frequencies or tones. The weights are complex numbers with the real component acting to modulate the amplitude of a tone while the complex component of the weight acts to modulate the phase of the same tone. Each tone in the weighted tone set bears a different data signal. The weighted tone set for a particular user is transmitted to the receiving station where it is processed with spatial despreading codes to recover the user's data signal. For each of the spatially separated antennas at the receiver, the received discrete tone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular discrete tone set and transmitting location. The PWAN system has a total of 2560 discrete tones (carriers) equally spaced in 8 MHz of available bandwidth in the range of 1850 to 1990 MHz. The spacing between the tones is 3.125 kHz. The total set of tones are numbered consecutively from 0 to 2559 starting from the lowest frequency tone. The tones are used to carry traffic messages and overhead messages between the base station and the plurality of remote units. The traffic tones are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Frequency Division Duplexing, (FDD) is used by the base station and the remote unit to transmit data and control information in both directions over different frequencies. Transmission from the base station to the remote unit is called forward transmission and transmission from the remote unit to the base station is called reverse transmission. The base station and each remote unit must synchronize and conform to the timing structure and both the base station and the remote unit must synchronize to a framing structure. All remote units and base stations must be synchronized so that all remote units transmit at the same time and then all base stations transmit at the same time. When a remote unit initially powers up, it must acquire synchronization from the base station so that it can exchange control and traffic messages within the prescribed time format. The remote unit must also acquire phase synchronization for the signals so that the remote is operating at the same frequency and phase as the base station.

When a remote unit is first installed, it transmits a signal over the CAC channel to the base station. This signal will probably be received at the base station at a time which is not the same as the other remote units transmitting to the base station. The difference between the expected time of the signal, and the time that the signal actually arrives at the base station, is the delay.

Previous systems that compensate for this delay have included systems which have a delay time measurement resolution that is limited. Furthermore, delay time measurement in a protocol is subject to both noise noise and multipath fading.

SUMMARY OF THE INVENTION

This invention solves the delay compensation problem by providing the base station with the ability to measure the magnitude and angle of the phase of delay compensation tones transmitted by the remote unit (RU) on the Common Access Channel (CAC), and calculating the slope of the phase ramp across the frequency range. Because the delay is proportional to the slope of the phase ramp, the delay can be calculated and transmitted to the RU on the Common Link Channel. The RU is provided with the ability to adjust the timing of the signals sent from the RU to the base station on the CAC.

The delay compensation pilots are discrete tones with frequencies that are uniformly spaced throughout each of the upper and lower sub-band frequency ranges. These tones are transmitted by the RU on the CAC and received by the base station. The received tones are digitized, sampled, passed through a Fast Fourier Transform (FFT) processor and stored in FFT incremental frequency bins as complex numbers. These numbers represent points in a 16 Quadrature Amplitude Modulation (QAM) constellation and are related to the average amount of energy of the received tone in the increment of frequency represented by the FFT bin.

In accordance with this invention, the base station uses the information about the signals received, as represented by the FFT bins, to calculate the amount of delay and prepare a signal containing the corresponding amount of compensation to be sent to the RU on the CLC.

In accordance with the invention, the phase difference between the expected phase angle and the received phase angle is calculated for each delay compensation pilot (DCP) tone. The difference in phase between each successive DCP tone is proportional to the time delay and the uniform frequency difference between tones. Because of this, the plot of phase difference as a function of frequency is a constant slope line, where the slope is proportional to the time delay.

In a first embodiment of the invention, the phase angle differences are measured by taking the FFT output representing the first DCP and multiplying it by the complex conjugate of the all sixteen of the FFT outputs from one of the two sub-bands. This gives sixteen phase angle measurements for slope calculation.

In a second embodiment of the invention, each symbol corresponding to the 16 elements of the QAM constellation is correlated with each symbol sequence from the sixteen FFT outputs from one sub-band. This allows sixteen phase-angle measurements based on the correlation coefficients.

In a third embodiment of the invention, the output of the FFT from both sub-bands is used. Sixteen symbol sequences are created from each sub-band, and then the first sequence of each sub-band are added to each other, then the second sequence of each sub-band, and so on until the sixteenth sequence of each sub-band are added together. Sixteen phase angle measurements are generated when the QAM symbol sequence is correlated with each of the 16 symbol sequences.

In a fourth embodiment of the invention, the output of the FFT from both sub-bands and from eight antenna elements is used. Sixteen symbol sequences are received from each sub-band for each antenna element. Sixteen symbol sequences are created when the 32 first sequences of each sub-band for each antenna element are summed, then the 32 second sequences of each sub-band for each antenna are summed, and so on until the 32 sixteenth sequences of each sub-band for each antenna are summed. Each summed sequence is normalized and correlated with the QAM symbol sequence to generate 16 phase angle measurements.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

FIG. 8 shows how the Final algorithm is implemented to provide phase angle measurements from 256 data points.

DETAILED DESCRIPTION

In the personal wireless access network (PWAN) application, there is a need for the radio signals from each remote unit (RU) to arrive at the base station at the same time. The RUs are at different distances from the base station. It takes a finite amount of time for signals from each RU to travel to and from the base station. It takes approximately 1 ns per foot for signals to propagate from the transmitter to receiver.

When a RU is installed, it needs to know when to transmit its signals in relation to the signals received from the base station so that its signal will arrive at the base station at the same time as the signals from the other Rus. The base station measures the difference between the expected time of arrival and the actual time of arrival of the RU signals. It then transmits this measurement information to the RU so it can advance or delay the time that it sends signals to the base station.

Figure 1:
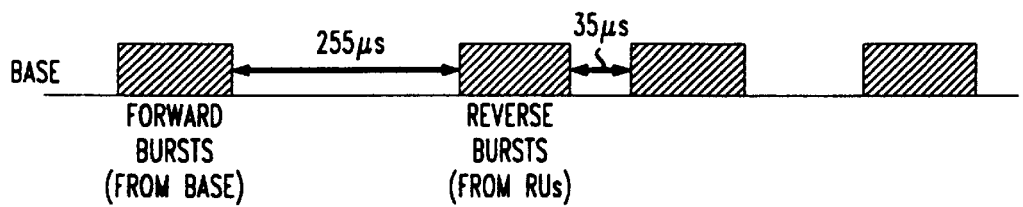
FIG. 1 is a block diagram showing signals sent and received at a base station.
Figure 2:
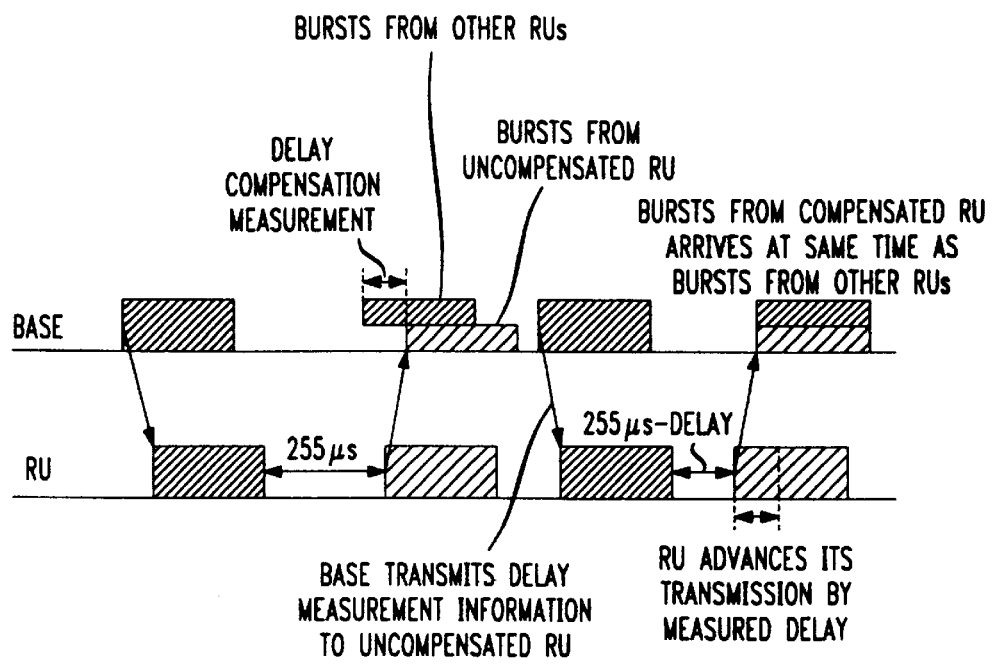
FIG. 2 is a block diagram showing how a delay compensation method acts to synchronize the signals of multiple remote units.

FIG. 1 shows the signals that appear at the base station. The base station expects to see the signals from the RU arrive 225 ms after it transmits its last burst. FIG. 2 shows the signals that appear at the base and the RU. Before the RU is compensated, the signals it transmits arrive at the base at a time that is different from the signals transmitted by the other Rus. The base measures the delay and transmits the measurement to the RU. The RU then adjusts the time of transmission to compensate for the delay.

Delay compensation can be performed upon installation and also at every call setup. The delay compensation calculation routine examines the average signal power in the signals used for the delay calculations and if they are above a certain threshold then a delay compensation measurement is made.

Phase Shift in Time-Delayed Sinusoids

There are sixteen tones available to the RU in each of the upper and lower sub-bands of a sub-band pair for Delay Compensation measurement purposes. These tones are referred to as Delay Compensation Pilots (DCPs).

The RU transmits the DCPs to the base station with each DCP having the same phase shift. If the RU has been compensated properly the DCP tones arrive at the base station in phase with each other. If the signal from the RU is delayed then each of the DCP tones experiences a phase shift.

A single DCP can be represented as a time domain signal in the form:

$$DCP_n(t) = \sin(2\pi f_n t + \phi_n)$$

If the signal is delayed by a time of $\tau$ then the equation of the delayed signal is:

$$DCP_n(t) = \sin(2\pi f_n(t-\tau) + \phi_n) = \sin(2\pi f_n t - 2\pi f_n \tau + \phi_n)$$

Thus a phase difference of $-2\pi f_n \tau$ is introduced by the delay. Each of the DCPs are delayed by the same time, $\tau$. When $\tau=0$, the DCPs all have the same phase. When $\tau \neq 0$, each of the DCPs has a phase difference proportional to the frequencies of the DCPs.

In the base, tones are 3.125 Khz apart. If two adjacent tones with the same phase are delayed by a time $\tau$, then the phase difference of the delayed tones is $2\pi(3.125 \text{ kHz})\tau$. Thus for every microsecond the signal is delayed, the phase of the adjacent tones defers by 0.019635 radians.

The Base measures the phase of each DCP and uses linear regression to fit the phases to a straight line. The slope of this line is proportional to the delay. A slope of zero indicates that no delay compensation is needed. A positive slope means that the signal is arriving too early and the RU needs to advance transmission of its signal.

Measuring Phase Differences

A tone can be represented by a complex value a+ib. this can also be written in the form $Ae^{j\Theta}$, where $A=(a^2+b^2)^{1/2}$ and $\Theta=\tan^{-1}(b/a)$. Here, A represents the magnitude of the tone and $\Theta$ represents the phase angle of the tone.

There are several ways of measuring the phase difference between two tones. One way is to calculate the phase of each tone and subtract them. This is computationally expensive however, as it requires two arctan computations and two divisions. Another way is to multiply the first complex value by the complex conjugate of the other. Mathematically, this is expressed as:

$$A_1 e^{j\Theta 1} \times B_1 e^{-j\phi 1} = A_1 B_1 e^{j(\Theta 1 - \phi 1)}$$

This results in a complex value that has a phase angle equal to the difference in phases of the two original values. Now, a single arctan and a division can be performed to determine the phase of this value.

If we have a sequence, A, of complex values $A_1 e^{j\Theta 1}$, $A_2 e^{j\Theta 2}$, ... $A_n e^{j\Theta n}$ that are then phase shifted by slightly different amounts, and also attenuated by different amounts to give the sequence B: $B_1 e^{j\Phi 1}$, $B_2 e^{j\Phi 2}$, ... $B_n e^{j\Phi n}$, we can calculate an average phase shift by correlating the original sequence of values with the resulting sequence. Correlation of the sequence A, with the sequence B is defined here as $$\sum_{i=1}^{n} A_i e^{j\theta_i} B_i e^{-j\phi_i}$$

The result of the correlation is known as the correlation coefficient. This is a complex value that has a phase angle equal to a weighted average of the phase differences of the corresponding elements of A and B. If the phase difference between the ith element of each sequence is constant then the correlation coefficient has a phase angle equal to this difference.

Correlation is a function that is very fast to perform on a digital signal processor (DSP) as it consists only of multiplications and additions.

Linear Regression

Figure 3:
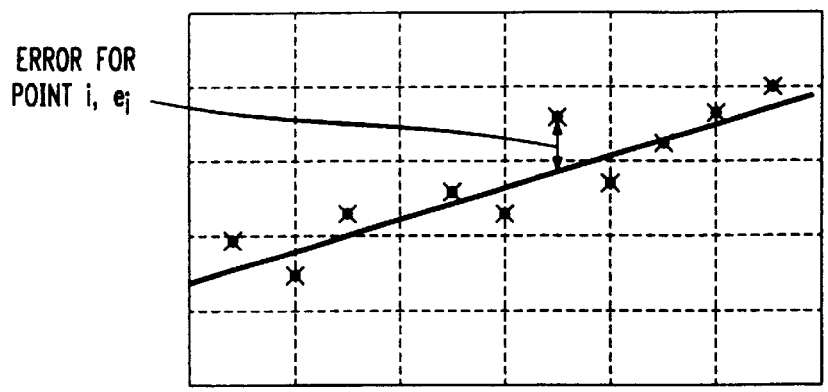
FIG. 3 is a plot showing a best-fit line for nine data points.

FIG. 3 shows how Linear Regression is used to find a line that is the 'best fit' to a set of data points. If is assumed that the data x-coordinates are known exactly and that the y-coordinate error is normally distributed. FIG. 3 shows some data points and the best fit line through those points. The 'best fit' in this case minimizes the sum of the squares of the errors between the y-coordinate of each point and the y value of the line for the x-coordinate of the point. The error, $e_i$ for one of the points is indicated in FIG. 3.

Linear regression is explained in many references. See, e.g.: Press et al., *Numerical Recipes in C, ad, ed, Cambridge University Press* 1992; Chapra et al., Numerical Methods for Engineers, ad, ed, Mcgraw-Hill 1989. A quick overview of the linear regression algorithm is also included here to aid understanding of how it works and how it used in the Delay Compensation algorithm of this invention.

Let $e_i$ be the error associated with the point $(x_i, y_i)$. Let the equation of the line be y=mx+c. The square of the error $e_i$ is given by: $e_i^2 = (y_i - mx_i - c)^2$ The sum of the squares of the errors is given by:

$$\sum_{i=1}^{n} e_i^2 = \sum_{i=1}^{n} (y_i - mx_i - c)^2$$

where there are n data points.

To minimize the sum of the squares, it is differentiated with respect to m and with respect to c to give two simultaneous equations:

$$\frac{d}{dc}\sum_{i=1}^{n} e_i^2 = -\sum_{i=1}^{n} 2(y_i - mx_i - c) = -2\sum_{i=1}^{n} y_i + 2m\sum_{i=1}^{n} x_i + 2cn$$

$$\frac{d}{dm}\sum_{i=1}^{n} e_i^2 = -\sum_{i=1}^{n} 2x_i(y_i - mx_i - c) = -2\sum_{i=1}^{n} x_i y_i + 2m\sum_{i=1}^{n} x_i^2 + 2c\sum_{i=1}^{n} x_i$$

For the best fit line, $e_i^2$ is at a minimum and the derivatives of $e_i^2$ are equal to zero. Setting the above equations equal to zero and solving for m gives:

$$m = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2}$$

Once m is calculated, c can be found by back substitution as follows:

$$c = \bar{y} - m\bar{x}$$

where the x and y are the mean values of y and x, respectively.

The formula for calculating m can also be written as:

$$m = \frac{\sum_{i=1}^{n} y_i(x_i - \bar{x})}{\sum_{i=1}^{n} (x_i - \bar{x})^2} = \sum_{i=1}^{n} y_i t_i$$

where:

$$t_i = \frac{x_i - \bar{x}}{\sum_{i=1}^{n} (x_i - \bar{x})^2}$$

This can be verified by direct substitution. If the $x_i$ values are the same each time the linear regression algorithm is called, as they are in the case of the delay compensation algorithm, then the $t_i$ values can be calculated once, at initialization, and the slope of the line is calculated by multiplying each $y_i$ by each $t_i$ and summing the results.

In the Delay Compensation algorithm, it is necessary to only solve for m and the final step of solving for c can be left out. The $x_i$ terms remain the same for each iteration of the delay compensation algorithm, so the process of fitting data to a best fit line and finding its slope can be implemented with one multiply and one addition per point on the line. This algorithm is ideally suited for implementation on a DSP.

Unwrapping Phase Angles

The phase angle of a complex value a+jb lies in the range $0\pm\pi$. If we write this value in the form $$Ae^{j\theta} \text{ then } A=\sqrt{a^2+b^2} \text{ and } \theta=\tan^{-1}(-b/a)$$

Figure 4:
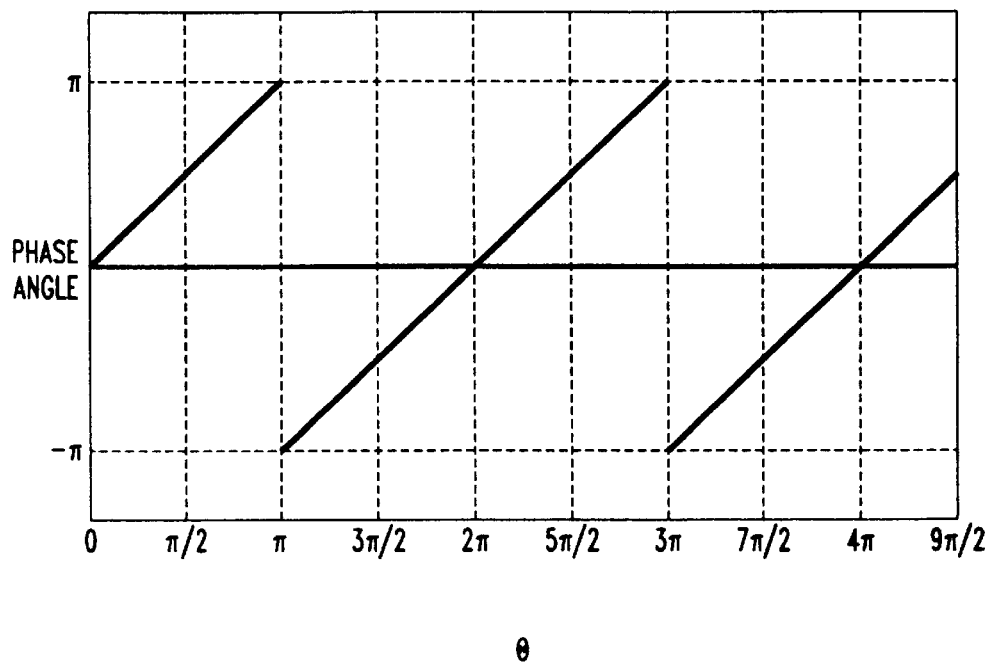
FIG. 4 is a plot showing how phase wrapping results from the use of an arctan function.

The $\tan^{-1}$ function returns a value between $-\pi$ and $\pi$. If $\theta$ is incremented continuously and a graph of the phase angle of $Ae^{j\theta}$ is plotted, the graph in FIG. 4 is the result. The phase angle increments until it reaches π and then jumps back down to −π. This is known as phase wrapping.

In the Delay Compensation algorithm of this invention the phase angle of each tone is calculated and the best straight line fit of these angles is calculated. However, the phase angles are in the range 0±π and need to be unwrapped before the linear regression algorithm is used on them.

To use the phase unwrapping algorithm, a positive cutoff point (pos_cut) and a negative cutoff point (neg_cut) need to be chosen. The cutoff points are used to decide when an angle needs to be unwrapped. If the difference between two phase angles is outside the range of the cutoff angles then the angles need to be unwrapped. Good, general purpose values for pos-cut and neg-cut are +π and −π respectively.

In the case of the base station, cutoff points of +π and −π are good first choice candidates. In simulations, these cutoff angles allowed Rus to be compensated at distances of up to approx 8000 feet. Once the Rus were positioned further away than 8000 feet, the phase difference between the angles was greater than −π. The unwrap algorithm treats this as a phase difference in the positive direction and doesn't unwrap directly in the positive direction and doesn't unwrap correctly. The way to fix this problem and allow Rus to be compensated at distances of greater than 8000 feet is to change the phase wrap cutoff points. Cutoffs of +π/2 and −3π/2 allows Rus to be compensated at up to 12000 feet. Cutoffs of +π/4 and −7π/4 could allow compensation at distances of up to 14000 feet.

The phase unwrapping algorithm first creates an array A and sets the first element in A equal to the first phase in the sequence. Next, it finds the difference between adjacent phases and stores these differences in A. The second element in A is set to the difference of the first and second phase angles etc.

The algorithm then creates another array, P. For every entry in A greater than pos_cut, that entry in P is set to −2π. For every entry in A less than neg_cut, that entry in P is set to +2π. If an entry in A is in the range neg_cut to pos_cut then the corresponding entry in P is set to 0.

Next each entry in P is replaced by the cumulative sum of all the previous entries. This is done by summing the entries starting at the first element and replacing each element by the sum so far. Once this is done, these elements of P are added to the original phases to give the unwrapped angles.

Phase Unwrapping Example

This example uses the algorithm described above with cutoff points of 0±π to unwrap a typical set of phase angle. The sequence of phase angles is:
{−0.1 −1.2 −2.2 −3.1 2.9 1.4 0.6 −0.8 −1.9 −2.7 2.8}
The array A is:
{−0.1 −1.1 −1.0 −0.9 6 −1.5 −0.8 −1.4 −1.1 −0.8 5.5}
The array P is:
{0 0 0 0 −6.28 0 0 0 0 0 −6.28}
Summing P and replacing each entry with the sum so far gives:
{0 0 0 0 −6.28 −6.28 −6.28 −6.28 −6.28 −6.28 −12.56}
Adding this to the original phase angles gives:
{−0.1 1.2 2.2 −3.1 −3.38 −4.88 −5.68 −6.88 −7.08 −8.18 −8.98 −9.76}
These phases are in a form that can be fitted to a straight line.

DCP Tone Mapping

Figure 5:
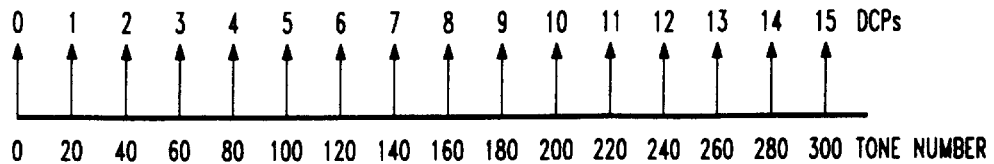
FIG. 5 shows the mapping between Delay Compensation Pilots and the PWANs tone number.

There are 320 tones in each of the upper sub-band of a sub-band pair. Of these 320 tones, 16 are used for delay compensation purposes. They are spaced 20 tones apart throughout the sub-band. The first DCP in a sub-band is at position 0, the next at position 20, etc., with the last tone at position 300. The tones in one sub-band are shown in FIG. 5. The DCPs in a given sub-band are numbered $DCP_0$ to $DCP_{15}$.

For every microsecond the signal form the RU is delayed, there is a phase difference of 0.3927 radians between adjacent DCPs in a sub-band.

Delay Compensation Algorithm

In order to minimize the effects of multipath fading that occur when signals are transmitted between the RU and the base station, DCPs are transmitted during eight consecutive bursts from the RU. Each burst contains 16 DCPs on the upper sub-band and a further 16 DCPs in the lower sub-band.

There are 8 symbols transmitted on the DCPs—one in each burst. This symbol set, S, is represented as $S_0, S_1, \ldots S_7$. $S_0$ is transmitted on all the DCPs of the first burst. $S_1$ is transmitted on all the DCPs of the second burst etc. The symbols are encoded using QPSK encoding and are normalized so their average power is equal to the average power of the traffic channel data.

The actual symbol set transmitted is:

$$S=[1-i,\ -1+i,\ 1+i,\ -1+i,\ -1-i,\ -1+i,\ -1-i,\ 1-i]\times f_n$$

where $f_n$ is the normalization factor.

The actual Delay Compensation Algorithm is best described in incremental stages. This helps show how the algorithm has been developed to make it as immune as possible to noise and multipath fading.

A first pass at calculating the phase difference of the DCPs is to simply take the DCPs of the upper or lower sub-band of one tone burst and multiply the first DCP by the complex conjugate of the other DCPs. This gives the phase difference between the DCP and the other DCPs in that burst. These phase differences can then be unwrapped and fitted to a straight line using linear regression. The slope of the line is proportional to the delay.

The above is a perfectly valid method of measuring the delay in the absence of noise, multipath channel fading and other interference. When these factors are taken into account, this algorithm doesn't provide reliable results and a more robust algorithm is required.

Figure 6:
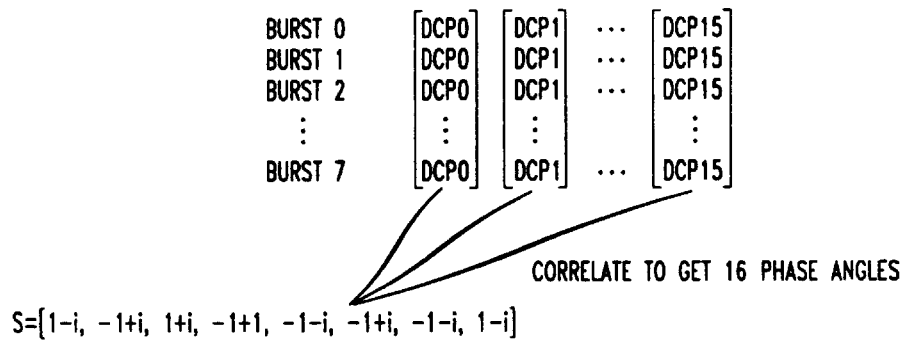
FIG. 6 shows how the Second Pass algorithm is implemented to provide phase angle measurements from 16 data points.

FIG. 6 shows how the Second Pass Algorithm is implemented. A second pass algorithm takes into account the DCPs from the upper or lower sub-band of all the tone bursts. Sixteen sequences are created from the DCPs in each burst. The first sequence consists of the DCP0 from each burst. The second sequence consists of the DCP1 form each burst, etc. The symbol set S is then correlated with each of these sequences. This results in sixteen correlation coefficients. The phase of each coefficient is then calculated and these phases are unwrapped and fitted to a best fit line using linear regression. Once again, the slope of the line is proportional to the delay in the signal from the RU.

This algorithm is much more robust than the first pass algorithm and averages out the effects of noise and multipath fading.

Figure 7:
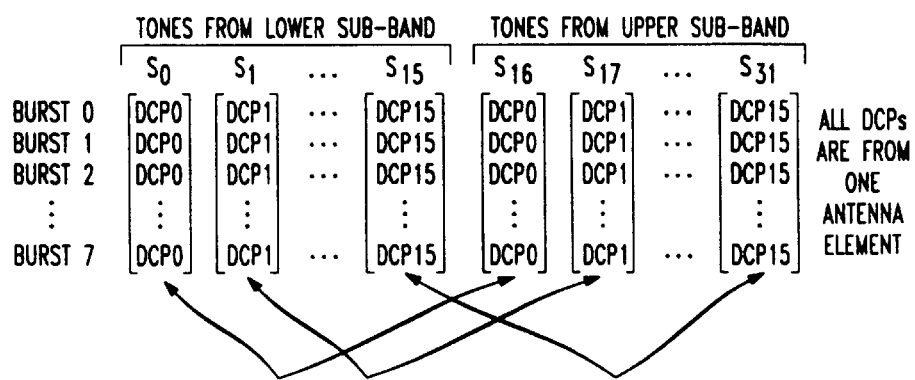
FIG. 7 shows how the Third Pass Algorithm is implemented to provide phase angle measurements from 32 data points.

FIG. 7 shows how the Third Pass algorithm is implemented. Even more accurate results can be obtained by using the DCPs from the upper and lower sub-bands off one antenna element. Thirty two sequences are created from the DCPs from eight bursts. The first sequence, $S_0$ consists of the DCP0 from the lower sub-band of each burst. The second sequence, $S_1$ consists of the DCP1 from the lower sub-band of each burst, etc. The seventeenth sequence, $S_{16}$ consists of the DCP0 from the upper sub-band of each burst etc.

Next $S_0$ and $S_{16}$ are correlated with other. This results in a correlation value, the phase angle of which is the phase difference of the two sequences. This correlation value is normalized to give it an absolute value of one. Next, $S_{16}$ is multiplied by the normalized autocorrelation value. This effectively 'rotates' the sequence $S_{16}$ to give it the same phase as $S_0$. Finally the corresponding elements of $S_0$ and $S_{16}$ are summed together. This sum also has the same phase as $S_0$ in the sense that if this sum is correlated with $S_0$, a real value results. This procedure is repeated for $S_1$ and $S_{17}$, $S_2$ and $S_{18}$ and so on until $S_{18}$ and so until $S_{15}$ and $S_{31}$ have been summed.

The original symbol set S is then correlated with each of these newly generated sequences. This results in sixteen correlation coefficients. The phase of each coefficient is then calculated and these phases are unwrapped and fitted to a best fit line using linear regression. Once again, the slope of the line is proportional to the delay in the signal from the RU.

Simulations have shown that this algorithm improves upon the results of the second pass algorithm.

FIG. 8 shows how the Final Algorithm is implemented. The Final Algorithm uses the DCP tone information from all eight antenna elements. Each antenna provides 32 sets of eight symbols. There are 32 DCPs per burst from each antenna, and eight bursts. Each set of symbols is made up of eight DCPs from one antenna, one DCP from each burst. The symbol sets from antenna 0 are numbered $S_0$ to $S_{31}$. Those from antenna 1 are numbered $S_{32}$ to $S_{63}$ etc. Those from antenna 7 are numbered $S_{240}$ to $S_{255}$ (see FIG. 4.8).

Symbol sets $S_0$, $S_{16}$, $S_{32}$, $S_{240}$ need to be added together and then the sum is correlated with the original symbol set, S, to determine the phase angle associated with that tone. To add them together, $S_0$ is correlated with $S_{16}$, the correlation coefficient is normalized and $S_{16}$ is multiplied by the normalized correlation coefficient. The same thing is done with $S_0$ and $S_{32}$, $S_0$ and $S_{48}$ and so on. Now $S_0$, $S_{16}$, . . . , $S_{240}$ are added together and this sum is correlated with S. The angle of the resulting correlation coefficient is the phase angle for that tone.

The above process is then repeated for $S_1$, $S_{17}$, $S_{33}$, $S_{49}$, . . . , $S_{241}$ to measure the phase angle for the second tone. This is repeated until all 16 phase angles have been measured. These phases are unwrapped and fitted to a best fit line using linear regression, as before. Yet again, the slope of the line is proportional to the delay in the signal from the RU.

No simulations have been done on the Final algorithm. However, it uses information from all eight antennas and from both sub-bands, averaging the data received before coming up with a result. As noted in the discussion about the Third Pass algorithm, improvements in measurement accuracy were obtained when data from the upper and lower sub-bands were averaged together. The Final algorithm uses eight times the amount of data as the Third Pass algorithm, thus making the measurement less susceptible to noise and multipath fading, and further improvements in measurement accuracy are expected. If processing time of the algorithm is an issue then a reduced version of the final algorithm can be used. In a reduced version, tones are processed from as many antennas as can be processed in the allotted time, with a slight reduction in the accuracy of the results.

Still another alternate embodiment applies the above described invention in the PWAN Frequency Division Duplex Communications System described in the Alamouti, Michaelson et al. patent application cited above.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims:

What is claimed is:

1. An apparatus for determining a delay compensation of signals transmitted between at least one remote unit and a base station of a wireless communication network, the apparatus comprising:
   means for receiving a first signal from the remote unit, the first signal comprising a plurality of delay compensation tones over a uniformly spaced frequency range;
   means for calculating a phase shift difference between an expected phase and the received phase of the first signal for each of the tones;
   means for unwrapping the phase shift difference associated with one or more of the tones;
   means for linearly regressing the phase shift difference and the unwrapped phase shift differences; and
   means for determining a slope of the linearly regressed phase shift differences, the slope being proportional to delay compensation.

2. The apparatus of claim 1, wherein the means for calculating comprises a digital signal processor (DSP).

3. The apparatus of claim 1, wherein means for calculating a phase shift difference includes means for calculating the phase shift difference from correlation coefficients relating to pairs of upper and lower sub-bands of tone burst, the first signal including the tone bursts.

4. The apparatus of claim 1, wherein means for calculating a phase shift difference includes means for calculating the phase shift difference from correlation coefficient relating to upper and lower sub-bands of the first signal received at one antenna element.

5. The apparatus of claim 1, wherein means for calculating a phase shift difference includes means for calculating the phase shift difference from correlation coefficients relating to upper and lower sub-bands of the first signal received at more than one antenna element.

6. The apparatus of claim 1, wherein the apparatus is a base station serving a geographic area of the wireless communication network.

7. A method for providing signals within wireless communication network, the comprising:
   providing a first signal to the network, the first signal including delay compensation pilot (DCP) tones comprising frequencies that are uniformly spaced through an upper sub-band frequency range and a lower sub-band frequency range;
   receiving a second signal from the network, the second signal including time adjustment data that is determined from a phase difference between an expected an phase angle and a received phase angle for each of the tones of the first signal, the phase difference being unwrapped, the unwrapped phase differences being fitted to a line, and a slope of the line being computed; and
   providing a third signal to the network, wherein a time of transmission of the third signal is configured in accordance with the time adjustment data so that DCP tones of the third signal arrive at the network in phase with each other.

8. The method of claim 7, wherein the slope of the line is proportional to the time adjustment data.

9. The method of claim 7, wherein the time adjustment data is determined from the upper and lower sub-bands of the frequency range received at more than one antenna element included in the network.

10. The method of claim 7, wherein the first signal is digitized into complex numbers representing a number of points in a Quadrature Amplitude Modulation (QAM) constellation, the complex numbers relating to an amount of energy of DCP tones in a frequency increment.

11. The method of claim 7, wherein the first signal is transmitted before the second signal is transmitted before the third signal.

12. A method for adjusting a time of transmission of a signal from a mobile unit to a base station, the method comprising:

receiving a first signal from the mobile unit, the first signal having a plurality of tones having upper-band and lower-band components over a uniformly spaced frequency range;

estimating a distance of the mobile unit from the base station;

determining a delay measurement relating to phase differences within the tones of the first signal and the estimated distance;

transmitting the delay measurements to the mobile unit, the delay measurement configured to adjust a time of transmission of a second signal from the mobile unit to compensate for a delay existing in the first signal; and determining cutoff phase angles in accordance with the estimated distance, wherein determining a delay measurement includes normalizing the phase differences to be within a range defined by the cutoff phase angles.

13. A system for providing time delay compensation between first and second stations in a wireless network, comprising:

means for receiving at the first station a plurality of discrete, delay compensation tones with frequencies that are uniformly spaced throughout a frequency range;

means for measuring a phase difference between an expected phase angle and a received a phase angle for each compensation tone;

means for calculating a rate of change of phase differences as a function of frequency for the compensation tones;

means for determining a time delay compensation from the rate of change and the uniform frequency spacing; and means for sending a signal indicating the time delay compensation to the second station.

14. A system for providing time delay compensation between first and second stations in a wireless network, comprising:

means for receiving at the first station a plurality of discrete, delay compensation tones with frequencies that are uniformly spaced throughout a frequency range;

means for measuring a phase difference between an expected phase angle and a received phase angle for each compensation tone;

means for calculating a rate of change of phase difference as a function of frequency for the compensation tones;

means for determining a time delay compensation from the rate of change and the uniform frequency spacing;

means for sending a signal indicating the time delay compensation to the second station; and means for adjusting timing at the second station using the time delay compensation signal.

* * * * *